US009887896B2

(12) United States Patent
Wilhelmsson et al.

(10) Patent No.: US 9,887,896 B2
(45) Date of Patent: Feb. 6, 2018

(54) HIDDEN NODE COUNTERACTION IN A WIRELESS NETWORK

(71) Applicant: Telefonaktiebolaget L M Ericsson (publ), Stockholm (SE)

(72) Inventors: Leif Wilhelmsson, Dalby (SE); Thomas Nilsson, Malmo (SE); Anders Furuskar, Stockholm (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 42 days.

(21) Appl. No.: 14/898,631

(22) PCT Filed: Jun. 19, 2013

(86) PCT No.: PCT/EP2013/062757

§ 371 (c)(1), (2) Date: Dec. 15, 2015

(87) PCT Pub. No.: WO2014/202134

PCT Pub. Date: Dec. 24, 2014

(65) Prior Publication Data

US 2016/0134506 A1 May 12, 2016

(51) Int. Cl.
*H04L 12/66* (2006.01)
*H04L 12/26* (2006.01)
(Continued)

(52) U.S. Cl.
CPC ............ *H04L 43/0876* (2013.01); *H04L 1/00* (2013.01); *H04W 74/0816* (2013.01); *H04W 74/002* (2013.01); *H04W 84/12* (2013.01)

(58) Field of Classification Search
CPC .......... H04L 43/0876; H04W 74/0816; H04W 84/12; H04W 74/002
(Continued)

(56) References Cited

U.S. PATENT DOCUMENTS 5,661,727 A 8/1997 Kermani et al.
7,756,542 B1 * 7/2010 Kaiser ................ H04L 41/0816 370/335

(Continued)

FOREIGN PATENT DOCUMENTS

EP 1509006 A1 2/2005

OTHER PUBLICATIONS

PCT International Search Report, dated Mar. 6, 2014, in connection with International Application No. PCT/EP2013/062757, all pages.

(Continued)

*Primary Examiner* — Faisal Choudhury
(74) *Attorney, Agent, or Firm* — Leffler Intellectual Property Law, PLLC

(57) ABSTRACT

A method for an access point of a wireless local area network is disclosed for counteracting problems with hidden nodes. The method comprises, for each individual terminal of a plurality of terminals wirelessly connected to the access point, detecting whether that individual terminal is a hidden node for one or more of the other terminals of the plurality of terminals. The method further comprises requesting that individual terminal to apply RTS/CTS signaling for data to be transmitted from that individual terminal to the access point only if it is detected that said individual terminal is a hidden node. A corresponding access point is also disclosed.

15 Claims, 6 Drawing Sheets

4r
4
2r
2
3
3r
1

(51) Int. Cl.
*H04L 1/00* (2006.01)
*H04W 74/08* (2009.01)
*H04W 74/00* (2009.01)
*H04W 84/12* (2009.01)

(58) Field of Classification Search
USPC .......................................................... 370/252
See application file for complete search history.

(56) References Cited

U.S. PATENT DOCUMENTS

2005/0041616 A1* 2/2005 Ginzburg .............. H04L 1/0021 370/328
2005/0213601 A1* 9/2005 Ginzburg .............. H04W 8/005 370/443
2006/0165047 A1* 7/2006 Kodama ................ H04B 3/542 370/350
2008/0009306 A1* 1/2008 Suga ..................... H04W 52/10 455/522
2010/0208618 A1* 8/2010 Kim ...................... H04L 1/1607 370/254
2010/0220679 A1* 9/2010 Abraham .............. H04W 74/06 370/329
2014/0044038 A1* 2/2014 Zhang ................... H04L 1/1854 370/328
2015/0085775 A1* 3/2015 Choi ................. H04W 74/0808 370/329
2015/0139175 A1* 5/2015 Ratasuk ................ H04L 5/0051 370/330

OTHER PUBLICATIONS

IEEE Std 802.11-2012 (Revision of IEEE Std 802.11-2007), Section 9.3.1 with Table of Contents, IEEE Standard for Information Technology—Telecommunications and information exchange between systems, Local and metropolitan area networks—Specific requirements; Part 11: Wireless LAN Medium Access Control (MAC) and Physical Layer (PHY) Specifications, New York, NY, USA, Mar. 29, 2012, 60 pages.

* cited by examiner

HIDDEN NODE COUNTERACTION IN A WIRELESS NETWORK

TECHNICAL FIELD

The present invention relates to counteraction of so called hidden node problems in wireless networks.

BACKGROUND

Wireless connectivity, such as the use of wireless local area networks (WLANs) standardized under the IEEE 802.11 standards, is growing more and more widespread. A benefit with wireless connectivity is that fewer cables are required. However, on the other hand, terminals connected to the same access point (AP) share a common medium (radio spectrum) for signal transmission, which can introduce interference and collisions between terminals that need to be handled in some way.

Carrier-sense multiple access (CSMA) is a means to share a channel between terminals without the need for centralized control or strict timing. One flavor of CSMA is CSMA with collision avoidance (CSMA/CA). In CSMA/CA, the channel is sensed before transmission, and in case the channel is busy, the transmission is deferred. CSMA/CA has many desirable properties, one being that it scales relatively well in that the supported data for an individual terminal degrades softly when the number of terminals is increased. This is in contrast to systems where transmission resources are reserved to the individual terminals and for which there therefore might be a distinct limit on the number of connected terminals that can be supported.

In systems based on CSMA, the so-called hidden node problem refers to the situation that one terminal (or "node") might not hear another node and thus, when listening for a busy medium, might not hear that another node is already transmitting and therefore initiates a transmission that causes a collision.

In order to address this problem, a request-to-send (RTS)/clear-to-send (CTS) signaling scheme can be employed. Such RTS/CTS signaling is defined in Section 9.3.1 of IEEE Standard for Information technology Telecommunications and information exchange between systems Local and metropolitan area networks Specific requirements: Part 11: Wireless LAN Medium Access Control (MAC) and Physical Layer (PHY) Specifications, March 2012 (IEEE Std 802.11—2012). A terminal (in the following referred to as the "source terminal") which intends to transmit a packet to an AP (or other destination, but the AP is the assumed destination in this discussion) can first send an RTS message to the AP. If the AP receives this request, it can reply with a CTS message to the source terminal, after which the transmission of the actual data from the source terminal to the AP is performed. Consider the case where the source terminal is hidden for another terminal connected to the AP, i.e. the other terminal cannot hear transmissions from the source terminal. However, the other terminal can hear the CTS message from the AP (it can reasonably be assumed that all terminals connected to the AP can hear the transmissions from the AP). Thus, the other terminal knows that a transmission is to be expected from the source terminal (even if it cannot hear the source terminal itself), and thus defers its own transmission to avoid collision with the transmission from the source terminal. There is still a risk that transmissions from the other terminal collide with the RTS message from the source terminal. However, the RTS message is significantly shorter (in time) than a typical data packet, and therefore the probability for a collision with the RTS message is much smaller than the probability for a collision with the actual data packet (had RTS/CTS signaling not been used).

A problem with the RTS/CTS signaling scheme is that it introduces a signaling overhead that might severely limit the overall system performance of a WLAN network.

Use of RTS/CTS for mitigation of the hidden node problem is discussed in U.S. Pat. No. 7,801,096 B2.

SUMMARY

An object of the present invention is to handle presence of hidden nodes in a wireless local-area network.

According to a first aspect, there is provided a method for an access point of a wireless local area network. The method comprises, for each individual terminal of a plurality of terminals wirelessly connected to the access point, detecting whether that individual terminal is a hidden node for one or more of the other terminals of the plurality of terminals. Furthermore, the method comprises requesting that individual terminal to apply request-to-send/clear-to-send (RTS/CTS) signaling for data to be transmitted from that individual terminal to the access point only if it is detected that said individual terminal is a hidden node.

Detecting whether said individual terminal is a hidden node for one or more of the other terminals may comprise detecting a number of occurrences of events indicative of a transmission from said one or more of the other terminals when said individual terminal is already transmitting. For example, an event indicative of a transmission from said one or more of the other terminals when said individual terminal is already transmitting may e.g. comprises that the access point has correctly decoded a media access control (MAC) header of the transmission from said individual terminal, but has failed to decode payload data of the transmission from said individual terminal. Furthermore, detecting whether said individual terminal is a hidden node for one or more of the other terminals may comprise determining whether said individual terminal is a hidden node for said one of the other terminals based on said number. For example, detecting whether said individual terminal is a hidden node for one or more of the other terminals may comprise determining that said individual terminal is a hidden node for said one or more of the other terminals if said number of occurrences, during a detection interval, exceeds a threshold value.

For detecting whether said individual terminal is a hidden node for one of the other terminals, the method may, according to some embodiments, comprise sending, to said one of the other terminals, a request for detecting whether said individual terminal is a hidden node for said one of the other terminals. Furthermore, the method may then comprise receiving, from said one of the other terminals, a response to said request, and determining that said individual terminal is a hidden node for said one of the other terminals if said response indicates that said individual terminal is a hidden node for said one of the other terminals.

According to a second aspect, there is provided an access point for a wireless local area network. The access point has one or more modes of operation and comprises a control unit. The control unit is adapted to, in a mode of operation of the access point and for each individual terminal of a plurality of terminals wirelessly connected to the access point, detect whether that individual terminal is a hidden node for one or more of the other terminals of the plurality of terminals. Furthermore, the control unit is adapted to request that individual terminal to apply RTS/CTS signaling for data to be transmitted from that individual terminal to the access point only if it is detected that said individual terminal is a hidden node.

For detecting whether said individual terminal is a hidden node for one or more of the other terminals, the control unit may be adapted to, for detecting whether said individual terminal is a hidden node for one or more of the other terminals, detect a number of occurrences of events indicative of a transmission from said one or more of the other terminals when said individual terminal is already transmitting. For example, an event indicative of a transmission from said one or more of the other terminals when said individual terminal is already transmitting may comprise that the control unit has correctly decoded a MAC header of the transmission from said individual terminal, but has failed to decode payload data of the transmission from said individual terminal. The control unit may further be adapted to determine whether said individual terminal is a hidden node for said one or more of the other terminals based on said number. For example, the control unit may be adapted to determine that said individual terminal is a hidden node for said one or more of the other terminals if said number of occurrences, during a detection interval, exceeds a threshold value.

For detecting whether said individual terminal is a hidden node for one of the other terminals, the control unit may be adapted to send, to said one of the other terminals, a request for detecting whether said individual terminal is a hidden node for said one of the other terminals. Furthermore, the control unit may be adapted to receive, from said one of the other terminals, a response to said request, and determine that said individual terminal is a hidden node for said one of the other terminals if said response indicates that the terminal is a hidden node for said one of the other terminals.

The control unit may be adapted to, in a mode of operation of the access point, upon detecting that an individual terminal is a hidden node for one or more of the other terminals, selectively ignore to request the individual terminal to apply RTS/CTS signaling. For example, the control unit may be adapted to ignore to request the individual terminal to apply RTS/CTS signaling if a power level of signals received at the access point from the individual terminal exceeds a threshold.

In some embodiments, the access point is a user equipment (UE), such as a mobile telephone, for connection to a cellular communication network, wherein the UE is adapted to share its cellular connectivity with said plurality of terminals via wireless local area network tethering.

According to a third aspect, there is provided a computer program product comprising computer program instructions for executing the method according to the first aspect when said computer program instructions are run by a programmable control unit of the access point.

According to a fourth aspect, there is provided a non-transitory computer readable medium having stored thereon a computer program product comprising computer program instructions for executing the method according to the first aspect when said computer program instructions are run by a programmable control unit of the access point.

It is an advantage of embodiments of the present invention that a relatively low RTS/CTS signaling overhead is obtained, since RTS/CTS signaling is requested only for the individual terminals that are identified as hidden nodes.

Further embodiments are defined in the dependent claims. It should be emphasized that the term "comprises/comprising" when used in this specification is taken to specify the presence of stated features, integers, steps, or components, but does not preclude the presence or addition of one or more other features, integers, steps, components, or groups thereof.

BRIEF DESCRIPTION OF THE DRAWINGS

Further objects, features and advantages of embodiments of the invention will appear from the following detailed description, reference being made to the accompanying drawings, in which.

DETAILED DESCRIPTION

Figure 1:
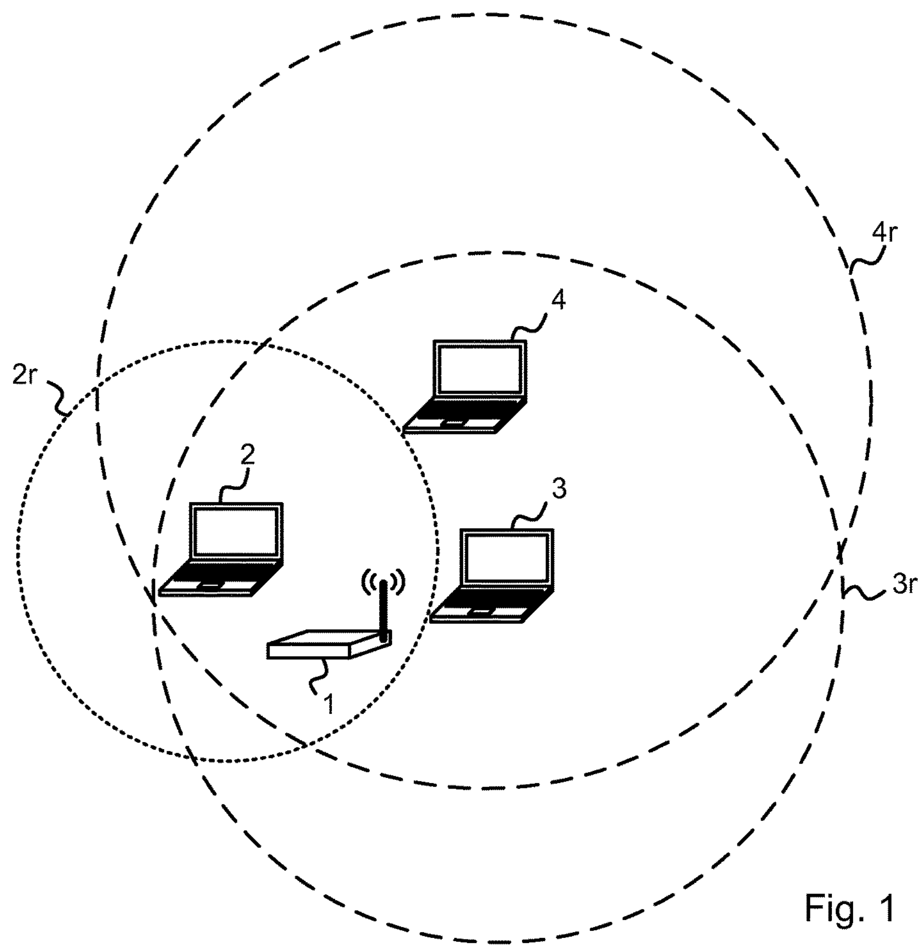
FIGS. 1-2 illustrate hidden node scenarios according to examples.
Figure 2:
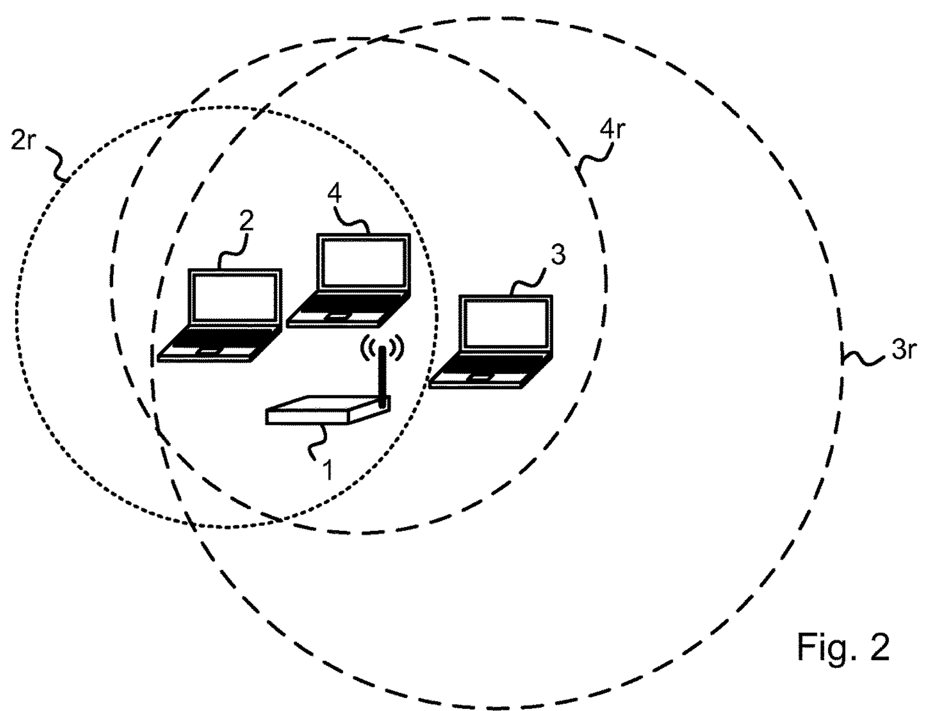

FIGS. 1 and 2 schematically illustrate an environment wherein embodiments of the present invention can be employed. A wireless local area network (WLAN) is illustrated having an access point (AP) 1 and a plurality (in this case three) of terminals 2, 3, 4, wirelessly connected to the AP 1. The equipment 1-4 (the term "equipment" is used in this specification as a common term for the AP 1 and the terminals 2, 3, 4) of the WLAN may e.g. comply with any of the IEEE 802.11 WLAN standards. Simplified indications of transmission ranges of transmissions from the terminals 2, 3, 4 are also included in FIGS. 1-2; equipment inside the borders 2*r*, 3*r*, and 4*r* are capable of detecting transmissions from the terminals 2, 3, and 4, respectively, whereas equipment outside the borders 2*r*, 3*r*, and 4*r* are not capable of detecting transmissions from the terminals 2, 3, and 4, respectively. Naturally, this is a simplified picture, but helpful to illustrate embodiments of the present invention. Typical reasons for an equipment not being capable of detecting transmissions from a terminal include that the power of said transmission picked up by said equipment is below a threshold level e.g. due to the distance between the equipment and the terminal, obstructing objects between the equipment and the terminal, or a combination thereof. Since the terminals 2, 3, 4 are connected to the AP 1, it is assumed herein that the AP 1 is capable of detecting transmissions from all the terminals 2, 3, 4, and likewise that all the terminals 2, 3, 4 are capable of detecting transmissions from the AP 1. For this reason, no transmission range of the AP 1 is indicated in FIGS. 1-2. An individual terminal of the terminals 2, 3, 4, whose transmissions cannot be detected by one or more of the other terminals, is said herein to be a hidden node for said one or more of the other terminals. For example, in FIG. 1, terminal 2 is a hidden node for the terminals 3 and 4, whereas terminals 3 and 4 are not hidden nodes. In FIG. 2, terminal 2 is still a hidden node, but only for terminal 3. In many situations (not shown in any of the figures), all terminals of a WLAN can detect each other's transmissions, in which case there are no hidden nodes in the network.

The AP 1 would typically have a connection to a wide area network (WAN), such as the internet, which it "shares" with the terminals 2,3,4, thus providing WAN connectivity also for the terminals. The AP 1 would thus typically be configured to act as a wireless router or switch for the terminals 2, 3, 4. Said WAN connection of the AP 1 may e.g. be a "fixed" WAN connection, such as over optical fiber, copper telephone wires (e.g. digital subscriber line (DSL) connection), a cable TV network, or the like. Alternatively, said WAN connection of the AP 1 may e.g. be provided over a cellular communication network, such as a GSM (Global System for Mobile communications) network, a UMTS (Universal Mobile Telecommunications System) network, or a 3GPP (3rd Generation Partnership Program) LTE (Long Term Evolution) network. Thus, the AP 1 may, in some embodiments be a user equipment (UE) for connection to a cellular communication network, wherein the UE is adapted to share its cellular connectivity with said plurality of terminals 2, 3, 4. For example, it is not uncommon that mobile telephones today, such as so called "smart phones", are capable of sharing their cellular connectivity using so called WLAN tethering.

The terminals 2, 3, 4 are illustrated in FIGS. 1-2 as laptop computers. However, this is only an example. The terminals 2, 3, 4 may be any kind of equipment, stationary or portable, capable of connecting wirelessly to the AP 1, such as computers, mobile phones, tablets, network cameras, network printers, etc., with WLAN capability.

Figure 3:
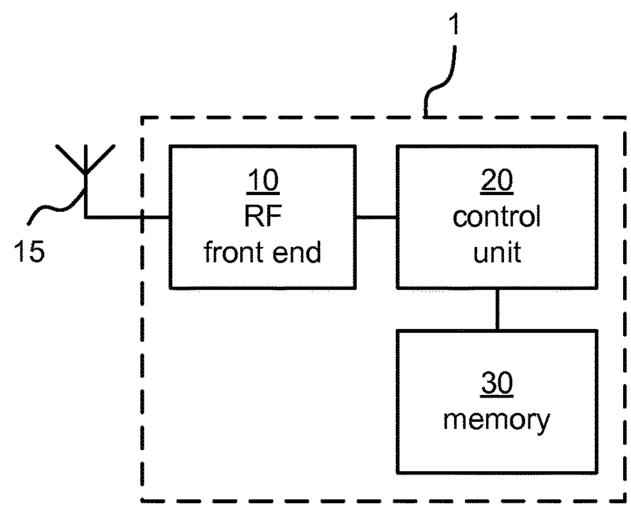
FIG. 3 is a simplified block diagram of an access point according to an embodiment of the present invention.

FIG. 3 is a simplified block diagram of the AP 1 according to an embodiment. It comprises a radio frequency (RF) frontend circuit 10 connected to an antenna 15. The antenna 15 may be comprised in the AP 1, or may be external to the AP 1. Although a single antenna 15 is illustrated in FIG. 15, multiple antennas may be used in some embodiments. The RF frontend circuit is adapted to generate RF signals to be transmitted by the AP 1 and receive RF signals from terminals 2, 3, 4 via the antenna 15. The RF frontend circuit 10 may, for these purposes, comprise circuitry such as filters, buffer amplifiers, low-noise amplifiers, power amplifiers, mixers, and/or data converters such as digital-to-analog and analog-to-digital converters (DACs and ADCs). The design of such RF frontend circuitry, per se, is well known in the art of electronic design and is therefore not further described herein. In the embodiment illustrated in FIG. 3, the AP further comprises a control unit 20 and a memory 30. The control unit 20 may e.g. be or comprise one or more programmable circuits, such as a digital signal processor (DSP) or baseband (BB) processor. The memory 30 may include volatile memory, such as random access memory (RAM), and/or nonvolatile memory such as flash memory or the like.

According to some embodiments of the present invention, there is provided a method for the AP 1. The method may e.g. be performed by (or under control of) the control unit 20. The method comprises, for each individual terminal of the plurality of terminals (e.g. 2, 3, 4 in FIGS. 1-2) wirelessly connected to the AP 1, detecting whether that individual terminal is a hidden node for one or more of the other terminals of the plurality of terminals 2, 3, 4. Furthermore, the method comprises requesting that individual terminal to apply request-to-send (RTS) signaling for data to be transmitted from that individual terminal to the AP 1 only if it is detected that said individual terminal is a hidden node. In some embodiments, the "only if" condition of the preceding sentence should be interpreted as "if and only if". However, in some embodiments, discussed further below in this text (e.g. in the context of FIG. 8), the AP 1 can selectively ignore to request hidden nodes to use RTS/CTS signaling under various circumstances. In some embodiments, the AP 1 may have a some modes of operation (e.g. a first mode) wherein said "only if" condition should be interpreted as "if and only if", and some modes of operation (e.g. a second mode) wherein the AP 1 can selectively ignore to request hidden nodes to use RTS/CTS signaling under various circumstances. (The AP 1 may additionally have one or more modes of operation in which RTS/CTS signaling is completely disabled and one or more modes of operation in which RTS/CTS signaling is always used.) The term "individual terminal" is used herein to distinguish one terminal from the other terminals of the plurality of terminals 2, 3, 4. The phrase "for each individual terminal of the plurality of terminals 2, 3, 4" should thus be interpreted as "for each terminal of the plurality of terminals 2, 3, 4" with the term "individual" being used merely as a label, or "index".

Figure 4:
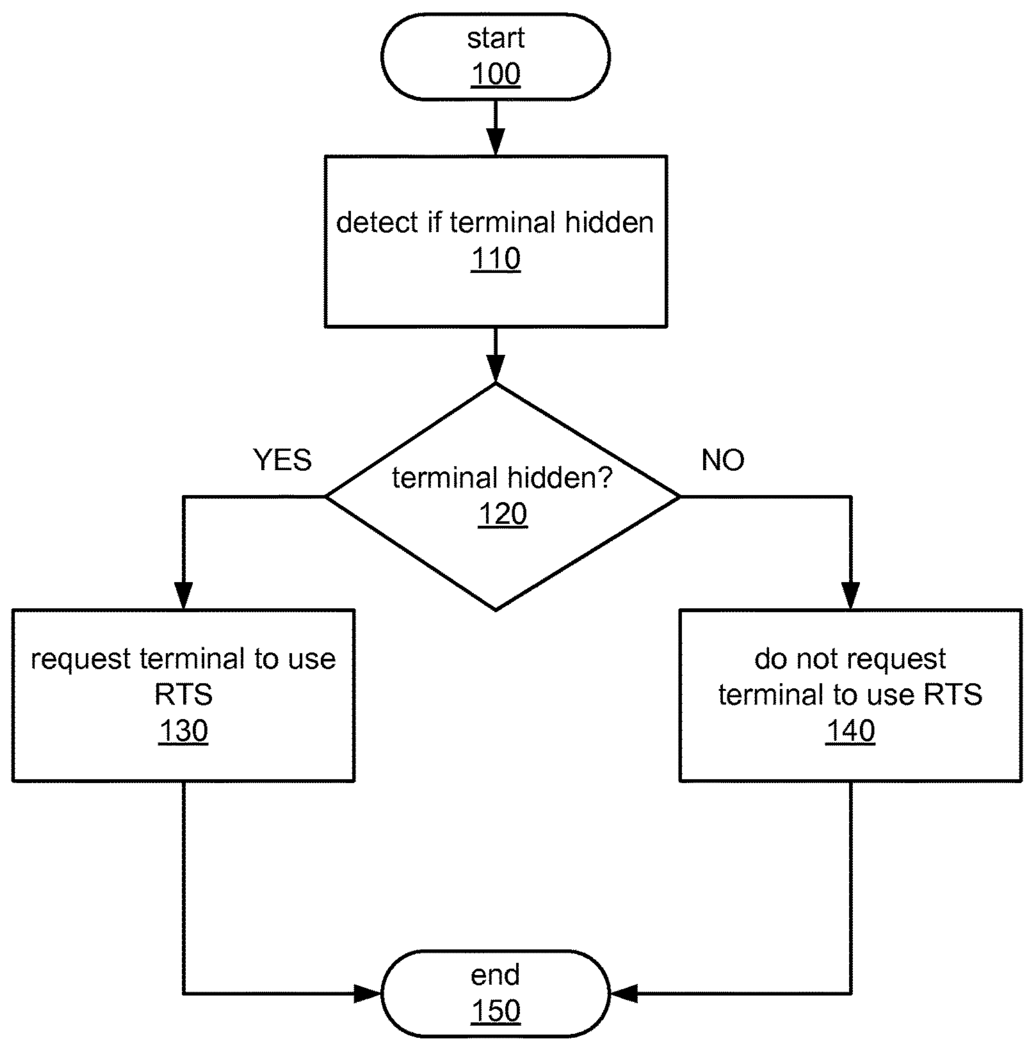
FIGS. 4-8 show flowcharts illustrating embodiments of the present invention.

FIG. 4 is a flowchart illustrating embodiments of said method for the AP 1. The flowchart illustrates the method for an individual terminal of the plurality of terminals 2, 3, 4 and should thus be executed by the AP 1 (e.g. by the control unit 20 of the AP 1) for each individual terminal of the plurality of terminals. The operation of the method is started in step 100. In step 110, the AP 1 detects whether the individual terminal is a hidden node for one or more of the other terminals. The result of the detection in step 110 is checked in step 120. If it is concluded that the individual terminal is a hidden node for one or more of the other terminals (YES branch from step 120), the operation proceeds to step 130. In step 130, a request is sent by the AP 1 (e.g. from the control unit 20 via the RF front end circuit 10 and antenna 15) for the individual terminal to use RTS/CTS signaling for data to be transmitted from that individual terminal to the AP 1. Subsequently, the operation is ended in step 150. If it is concluded that the individual terminal is not a hidden node for any of the other terminals (NO branch from step 120), the operation proceeds to step 140, in which the individual terminal is not requested to use RTS/CTS signaling for data to be transmitted from that individual terminal to the AP 1. Subsequently, the operation is ended in step 150. In some embodiments, the step 140 includes actively signaling to the individual terminal not to use RTS/CTS signaling. This could e.g. be useful in a situation where the individual terminal was earlier a hidden node and requested to use RTS/CTS signaling, but has ceased to be a hidden node (e.g. due to a physical relocation of the individual terminal or of the terminal for which the individual terminal was earlier a hidden node).

Embodiments of the method may be repeated as necessary to account for changes of the radio environment, e.g. the addition or removal of terminals to/from the WLAN network, the addition or removal of obstructing objects, or the physical relocation of equipment of the WLAN network. For example, the method may be executed continually, repeated on a regular basis, or when the AP 1 obtains some indication of insufficient throughput of the WLAN network (which could be caused by one or more nodes being hidden).

If one of the other terminals starts transmitting when the individual terminal is already transmitting, this is an indication that the individual terminal is a hidden node for said one of the other terminals. According to some embodiments, detecting whether an individual terminal is a hidden node for one or more of the other terminals therefore comprises detecting (by the AP 1) a number of occurrences (e.g. during some dedicated detection interval) of events indicative of a transmission from said one or more of the other terminals when said individual terminal is already transmitting. Such an event is in the following referred to as a "collision event", and may e.g. comprise that the AP 1 has correctly decoded a media access control (MAC) header of the transmission from said individual terminal, but has failed to decode payload data of the transmission from said individual terminal. The failure to decode the payload data may be due the presence of an interferer, such as a transmission from one of the other terminals, during the transmission of the payload data. The determination, by the AP 1, whether said individual terminal is a hidden node for one or more of the other terminals may be based on said number of collision events. If such collision events occur only rarely, they might be due to a temporary hidden node condition, a hidden node condition that is not a practical problem, or be caused by some other source of interference than transmissions from the other terminals (and in that case not be caused by a hidden node condition at all). In such case it should, according to some embodiments, be avoided to request the individual terminal to use RTS/CTS signaling. For instance, according to some embodiments, a threshold value $N_{TH}$ may be used by the AP 1 (e.g. by the control unit 20) for the purpose of determining, based on said number of collision events, whether the individual terminal is a hidden node. For example, the individual terminal may be determined to be a hidden node if said number of occurrences (of collision events), during a detection interval, exceeds the threshold value $N_{TH}$. According to some embodiments, a suitable length of the detection interval is in the order of a few seconds, for example somewhere between 1 and 10 seconds, or thereabouts. According to some embodiments, a suitable threshold value $N_{TH}$ is ≥1, such as 1, 2, 3, 4, or 5 (meaning that at least 2, 3, 4, 5, or 6 collision events, respectively, are needed to trigger the use of RTS/CTS signaling), which has the advantage of not triggering RTS/CTS signaling for rarely occurring collision events as discussed above. However, a threshold value of $N_{TH}=0$ can be used as well (meaning that a single collision event is enough to trigger the use of RTS/CTS signaling).

Figure 5:
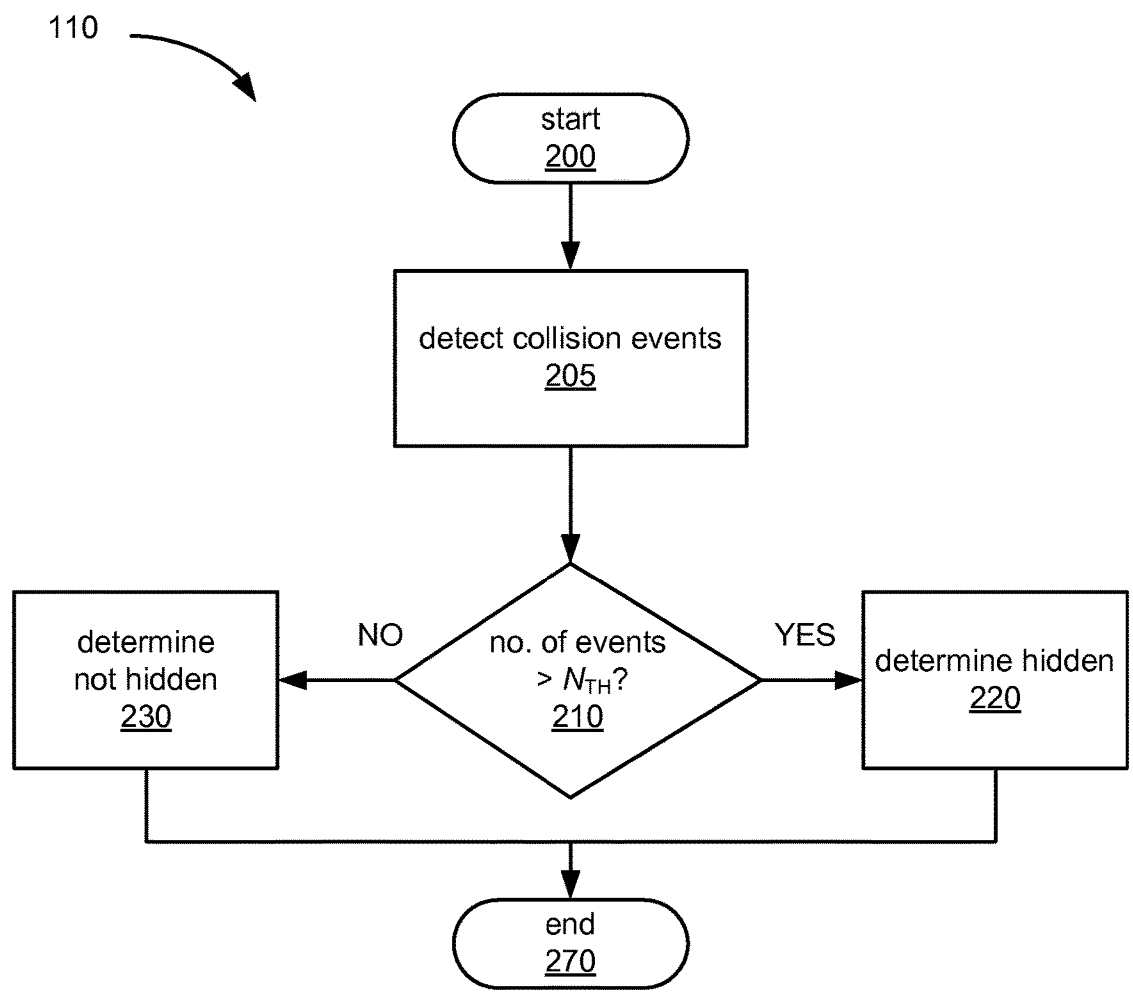

FIG. 5 is a flowchart for an embodiment of the step 110 (FIG. 4) taking into account the number of collision events and the threshold value $N_{TH}$ discussed in the paragraph above. The operation of this embodiment of step 110 is commenced in step 200. In step 205, collision events, as defined above, are detected (and counted) during a detection interval. In step 210, it is checked whether the number of detected collision events exceeds the threshold value $N_{TH}$. If so (YES branch from step 210), it is determined in step 220 that the individual terminal under consideration is a hidden node for one or more of the other terminals. Subsequently, the operation of this embodiment of step 110 is ended in step 270. If the number of collision events during the detection interval does not exceed the threshold value $N_{TH}$ (NO branch from step 210), it is instead determined in step 230 that the individual terminal under consideration is not a hidden node for any of the other terminals. Subsequently, the operation of this embodiment of step 110 is ended in step 270.

The AP 1 may interact with the terminals 2, 3, 4 to determine whether any of the terminals 2, 3, 4 is a hidden node. For example, detecting whether an individual terminal is a hidden node for one of the other terminals, may comprise sending to said one of the other terminals, a request for detecting whether said individual terminal is a hidden node for said one of the other terminals and receiving, from said one of the other terminals, a response to said request. The request sent out to the other terminal from the AP 1 may e.g. include the MAC address of the individual terminal under consideration, and the other terminal can determine whether that individual terminal is hidden for it or not by listening to transmissions in the network and concluding whether or not it can detect any transmissions having that MAC address as source address. If the response indicates that said individual terminal is a hidden node for said one of the other terminals, the AP 1 may consequently determine that said individual terminal is a hidden node for said one of the other terminals. For example, if such requests are sent to all of the other terminals, and the response from at least one of these other terminals indicates that said individual terminal is a hidden node for that at least one of the other terminals, the AP 1 may consequently determine that said individual terminal is a hidden node for one or more of the other terminals, and the YES branch may be taken from step 120 (FIG. 4).

Figure 6:
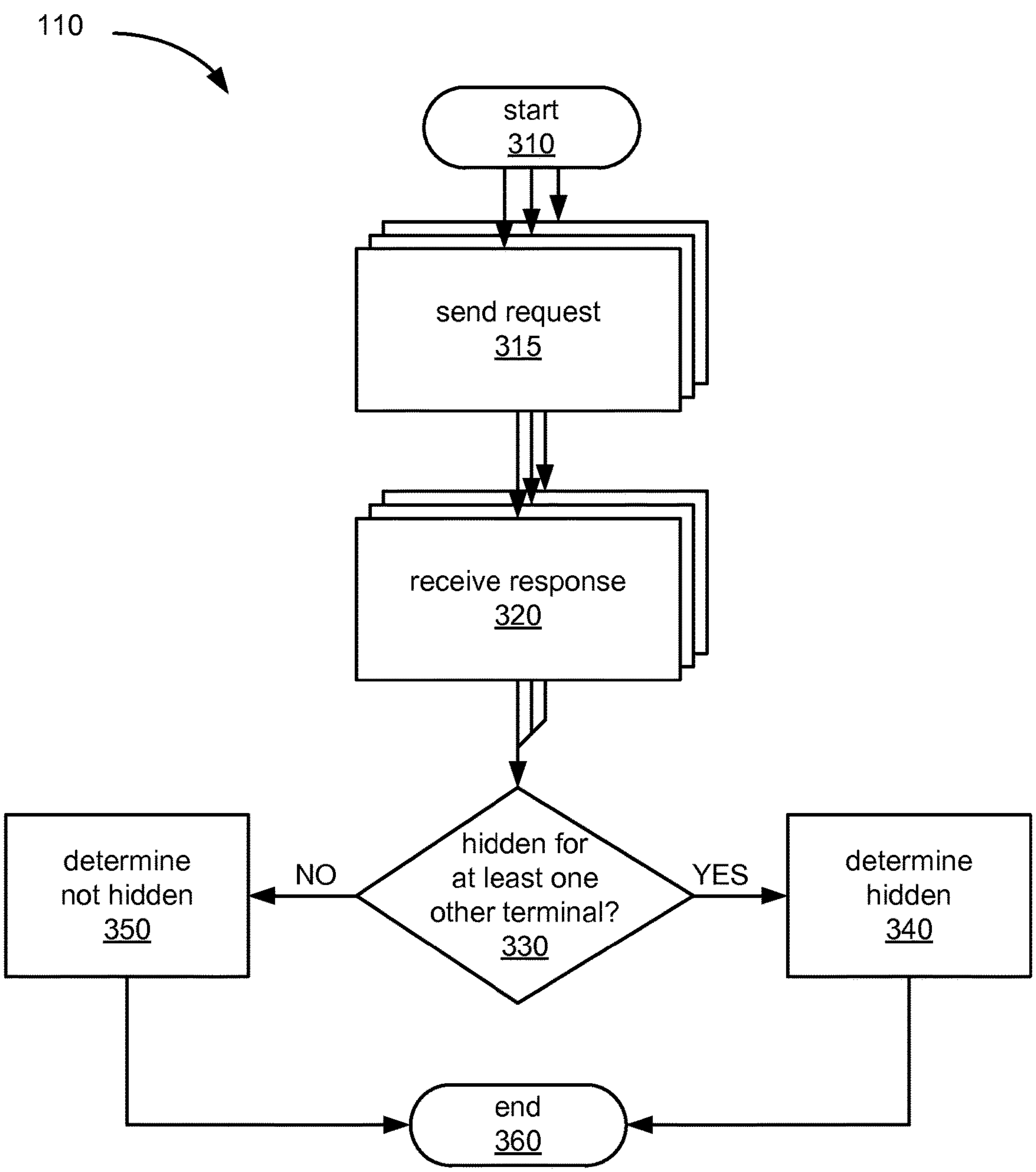
Figure 7:
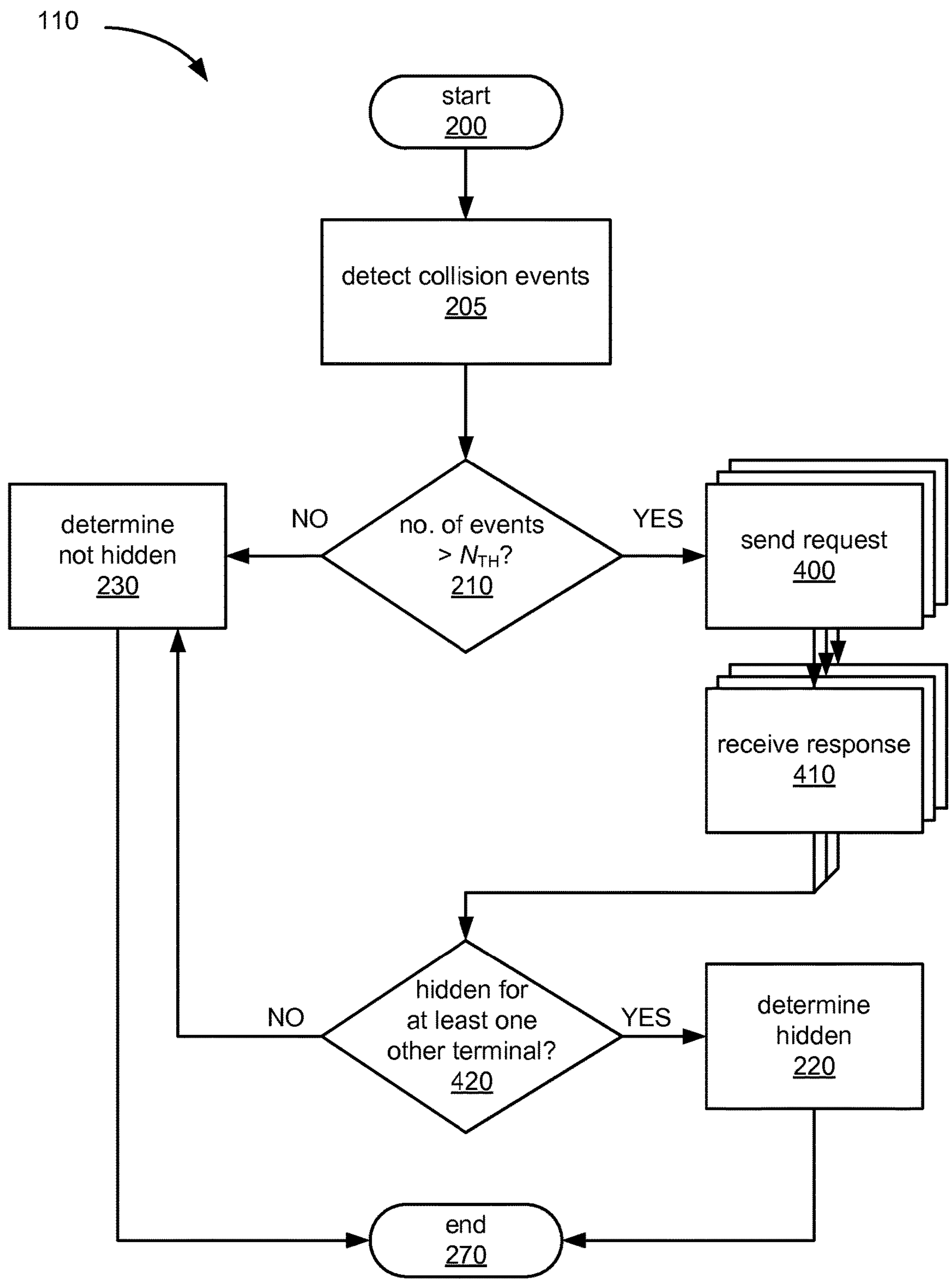

Flowcharts illustrating embodiments of step 110 where such requests and responses are used to determine whether or not an individual terminal is a hidden node or not are shown in FIGS. 6 and 7. In FIG. 6, operation of the illustrated embodiment of step 110 is started in step 310. In step 315, a request is sent to each one of the other terminals for detecting whether said individual terminal is a hidden node for said one of the other terminals. Parallel boxes are used in FIG. 6 for step 315 to illustrate that requests may be sent to multiple other terminals. In step 320, a response to the request sent in step 315 is received from each one of the other terminals. Again, parallel boxes are used in FIG. 6 for step 320 to illustrate that responses may be received from multiple other terminals. In step 330, the responses from the other terminals received in step 320 are checked. If at least one of the responses indicates that the individual terminal is a hidden node for a corresponding one of the other terminals (YES branch from step 330), it is determined in step 340 that the individual terminal is a hidden node for at least one of the other terminals. Subsequently, the operation of this embodiment of step 110 is ended in step 360. Otherwise, i.e. if none of the responses indicates that the individual terminal is a hidden node for a corresponding one of the other terminals (NO branch from step 330), it is determined in step 350 that that the individual terminal is not a hidden node for any of the other terminals. Subsequently, the operation of this embodiment of step 110 is ended in step 360. Sending requests (step 315) to, and receiving responses (step 320) from, multiple terminals in parallel is only an example. (Note that the word "parallel" in this context does not mean that all transmissions of requests to the terminals occur at exactly the same time (although they could), nor that the responses from the terminals are received at exactly the same time (which should be avoided when using CSMA/CA). Rather, it means that the overall process of sending a request to and receiving a response from a terminal takes place for multiple terminals in parallel, although there might be differences between different terminals for when exactly that overall process starts and/or ends.) In other embodiments, requests may e.g. be sent to a single one of the other terminals (at a time), and after receiving and checking the response from that single one of the other terminals, it can be decided if it is needed to send requests to further ones of the other terminals or not. For example, if the response received from the single one of the other terminals indicates that the individual terminal under consideration is a hidden node for that single one of the other terminals, it can be determined that the individual terminal is a hidden node for at least one of the other terminals without sending any requests to any further ones of the other terminals, whereby valuable radio signaling resources can be saved. This can be particularly useful in cases where the individual terminal under consideration has earlier been detected by the AP 1 to be a hidden node for one or more of the other terminals, and the detection now involves detecting whether that individual terminal is still a hidden node for one or more of the other terminals. Then, it would make sense to first send requests to the one or more of the other terminals for which that individual terminal was earlier detected to be a hidden node.

The flowchart in FIG. 7 is a modified version of the flow chart in FIG. 5. Steps already described above with reference to FIG. 5 are not further described below in any great detail. As for FIG. 5, in step 210, it is checked whether the number of detected collision events exceeds the threshold value $N_{TH}$. However, instead of proceeding directly to step 220 (which is the case in FIG. 5) if this is the case, the operation of the embodiment of step 110 illustrated in FIG. 7 instead follows the YES branch from step 210 to step 400. In step 400, a request is sent to each one of the other terminals for detecting whether said individual terminal is a hidden node for said one of the other terminals. As in FIG. 6, parallel boxes are used in FIG. 7 for step 400 to illustrate that requests may be sent to multiple other terminals. In step 410, a response to the request sent in step 400 is received from each one of the other terminals. Again, parallel boxes are used in FIG. 7 for step 410 to illustrate that responses may be received from multiple other terminals. In step 420, the responses from the other terminals received in step 410 are checked. If at least one of the responses indicates that the individual terminal is a hidden node for a corresponding one of the other terminals (YES branch from step 420), it is determined in step 220 that the individual terminal under consideration is a hidden node for one or more of the other terminals. Subsequently, the operation of this embodiment of step 110 is ended in step 270. Otherwise, i.e. if none of the responses indicates that the individual terminal is a hidden node for a corresponding one of the other terminals (NO branch from step 420), it is determined in step 230 that that the individual terminal is not a hidden node for any of the other terminals. Subsequently, the operation of this embodiment of step 110 is ended in step 270. As discussed above regarding the embodiment illustrated in FIG. 6, sending requests (step 400) to, and receiving responses (step 410) from, multiple terminals in parallel is only an example. In other embodiments, requests may e.g. be sent to a single one of the other terminals (at a time), and after receiving and checking the response from that single one of the other terminals, it can be decided if it is needed to send requests to further ones of the other terminals or not. The considerations are the same as discussed above for FIG. 6 and are therefore not repeated in the context of FIG. 7.

Figure 8:
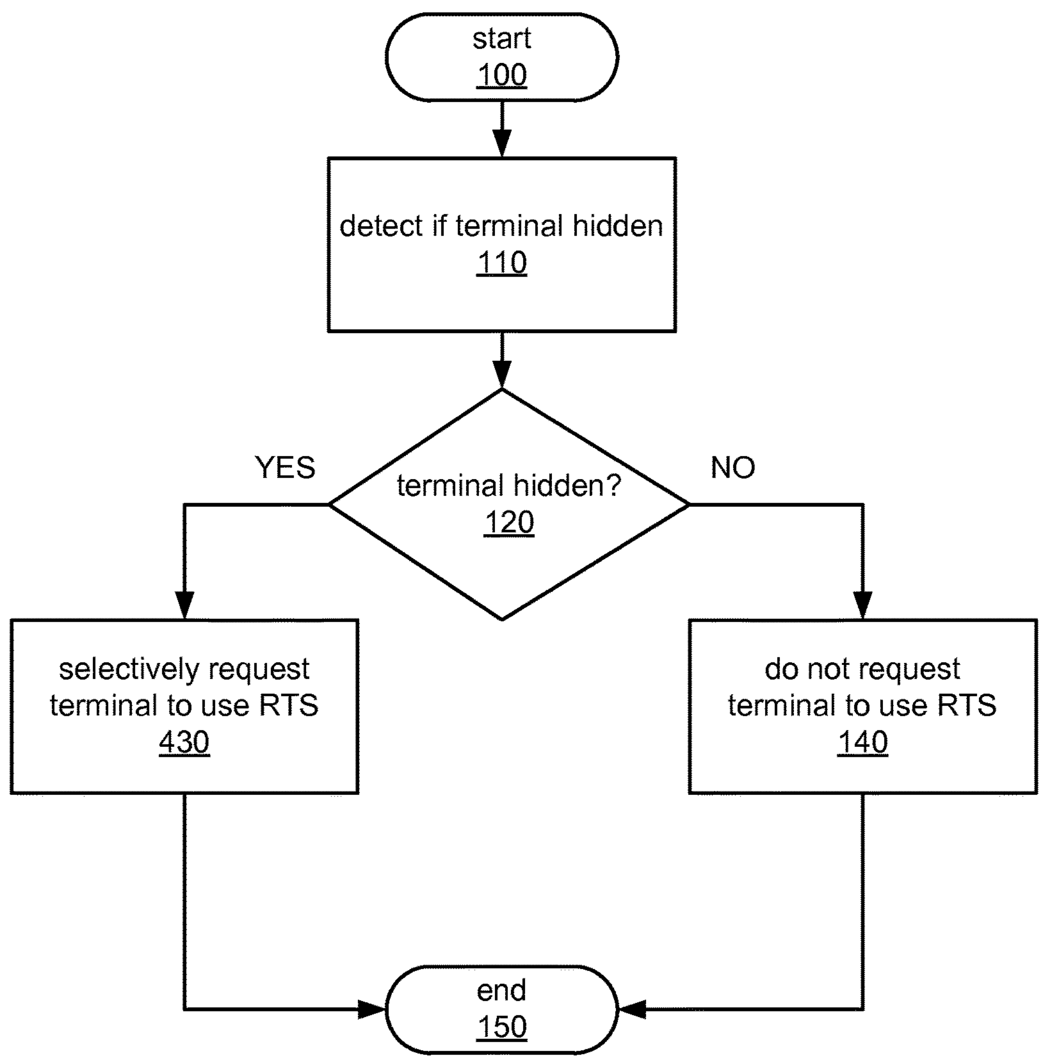

As already indicated above, the AP 1 may have one or more modes of operation. In some modes (for example a first mode) an individual terminal may be requested to apply RTS/CTS signaling if and only if it is detected that the individual terminal is a hidden node for one or more of the other terminals. Alternatively or additionally, in some modes (such as a second mode) the AP 1 may selectively ignore to request the individual terminal to apply RTS/CTS signaling even if it is detected that the individual terminal is a hidden node for one or more of the other terminals. Alternatively phrased, in the event that the AP 1 has detected that the individual terminal is a hidden node for one or more of the other terminals, it may selectively request the individual terminal to apply RTS/CTS signaling. Such embodiments are illustrated with a flowchart in FIG. 8, which is a modified version of the flow chart in FIG. 4. In FIG. 8, the step 130 of FIG. 4 has been replaced with step 430. The other steps in FIG. 8 correspond to those in FIG. 4 and are not further described in the context of FIG. 8. In step 430, the AP 1 may assess one or more criteria, in addition to the fact that the individual terminal is a hidden node, and based on the assessment of these criteria, determine whether the individual terminal should be requested to apply RTS/CTS signaling.

One such criterion could involve to power levels of signals received from the individual terminal. Consider for example a case where two terminals, say terminal 2 and terminal 3, are both hidden nodes for each other (i.e., none of them can hear the others transmissions), but where the received signal power (i.e. received by the AP 1) from terminal 2 is significantly higher than the received signal power from terminal 3. Then, in the event of a collision between signals from terminal 2 and terminal 3, the signal from terminal 2 might be correctly detected by the AP 1, whereas the signal from terminal 3 might not due to the interference presented by the signal from terminal 2. In such a situation, RTS/CTS signaling overhead might be reduced by only requesting terminal 3 to apply RTS/CTS signaling, but not request terminal 2 to apply RTS/CTS signaling (compared with requesting both terminal 2 and terminal 3 to apply RTS/CTS signaling). Thus, according to some embodiments, the AP 1 can selectively ignore to request the individual terminal to apply RTS/CTS signaling if a power level of signals received at the AP 1 from the individual terminal exceeds a threshold. The threshold may be a fixed threshold, such as a fixed predetermined threshold, or can be a threshold that is dynamically set, e.g. based on or relative to power levels of signals received at the AP 1 from other terminals in the network.

Another such criterion may involve the data traffic intensity of the terminals in the network. Consider for example a case where one terminal, say terminal 2, is a hidden node for another terminal, say terminal 3 (this is the situation depicted in FIG. 2). In that case, transmissions from terminal 2 can be corrupted by colliding transmissions from terminal 3. However, if the traffic from terminal 3 is relatively low (i.e., terminal 3 transmits relatively few packets per unit time), then such colliding transmissions from terminal 3 might be relatively rare, and the overhead for RTS/CTS signaling that would result from requesting terminal 2 to apply RTS/CTS signaling might be more costly from an overall system performance consideration than the overhead for retransmissions from terminal 2 due to colliding transmissions from terminal 3. In such cases, the AP 1 may in some embodiments ignore requesting the individual terminal (terminal 2 in the discussion above) to apply RTS/CTS signaling even if the individual terminal is detected to be a hidden node for another terminal (terminal 3 in the discussion above).

Yet another such criterion may involve real-time requirements on the data traffic from the individual terminal under consideration. In the following, it is assumed that the AP 1 has detected that the individual terminal is a hidden node for one or more of the other terminals. If the individual terminal only requires background traffic or best effort traffic, the AP 1 may then decide to ignore requesting the individual terminal to apply RTS/CTS signaling, since retransmissions of packet could in these cases be acceptable. However, if instead the data transmitted from the individual terminal comprises real-time critical data, such as real-time video or voice traffic, the AP 1 may decide that the individual terminal should apply RTS/CTS signaling, since the delay caused by retransmissions of packets might not be acceptable in such cases.

Above, aspects of the invention have been discussed mostly embodied in the form of a method. According to some aspects of the invention, embodiments of the AP 1 are also provided. In general, the control unit 20 can be adapted to perform, or control execution of, any of the method steps to be performed by the AP 1 as described above. Accordingly, according to some embodiments, the control unit 20 is adapted, in a mode (e.g. the above-mentioned first mode) of operation of the AP 1 and for each individual terminal of the plurality of terminals 2,3,4, detect whether that individual terminal is a hidden node for one or more of the other terminals, and request that individual terminal to apply RTS/CTS signaling for data to be transmitted from that individual terminal to the AP 1 only if it is detected that said individual terminal is a hidden node. For example, as discussed above with reference to FIGS. 5 and 7, the control unit 20 may be adapted to detect a number of occurrences of events indicative of a transmission from said one or more of the other terminals when said individual terminal is already transmitting (above referred to with the term "collision event"), and determine whether said individual terminal is a hidden node for said one or more of the other terminals based on said number. For example, as mentioned above, an event indicative of a transmission from said one or more of the other terminals when said individual terminal is already transmitting may comprise that the control unit 20 has correctly decoded a MAC header of the transmission from said individual terminal, but has failed to decode payload data of the transmission from said individual terminal. Moreover, as indicated above, the control unit 20 may be adapted to determine that said individual terminal is a hidden node for said one or more of the other terminals if said number of occurrences, during a detection interval, exceeds the threshold value $N_{TH}$.

As is stated above, the AP 1 may interact with the terminals 2, 3, 4 to determine whether any of the terminals 2, 3, 4 is a hidden node. For example, for detecting whether a particular individual terminal is a hidden node for one of the other terminals, the control unit 20 may be adapted to send, to said one of the other terminals, a request for detecting whether said individual terminal is a hidden node for said one of the other terminals. Furthermore, the control unit 20 may be adapted to receive, from said one of the other terminals, a response to that request, and to determine that said individual terminal is a hidden node for said one of the other terminals if said response indicates that the terminal is a hidden node for said one of the other terminals.

Furthermore, in a mode (e.g. the above-mentioned second mode) of operation of the access point 1, the control unit 20 may be adapted to, upon detecting that a terminal is a hidden node for one or more of the other terminals, selectively ignore to request the terminal to apply RTS/CTS signaling, e.g. if a power level of signals received at the access point 1 from the terminal exceeds a threshold as explained above.

Figure 9:
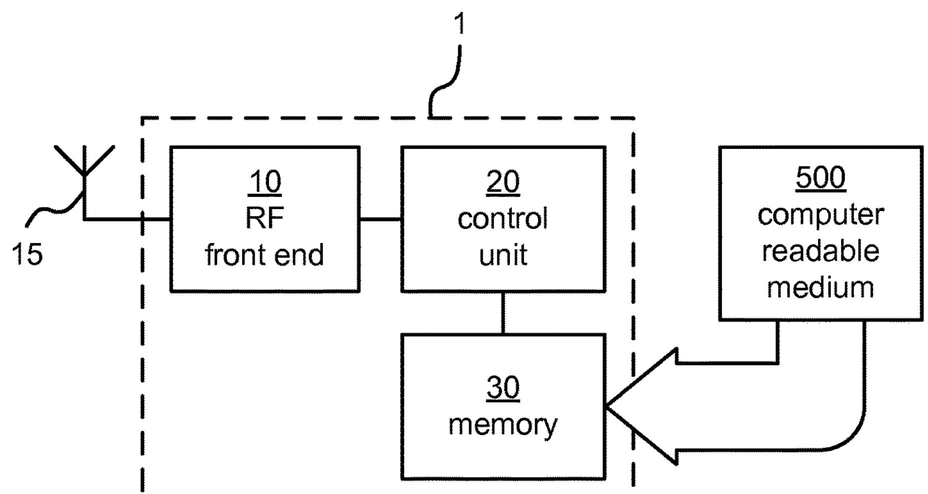
FIG. 9 schematically illustrates an access point and a computer-readable medium.

In some embodiments, the control unit 20 may be implemented as a dedicated application-specific hardware unit. Alternatively, said control unit 20, or parts thereof, may be implemented with programmable and/or configurable hardware units, such as but not limited to one or more field-programmable gate arrays (FPGAs), processors, or microcontrollers. Thus, the control unit 20 may be a programmable control unit. Hence, embodiments of the present invention may be embedded in a computer program product, which enables implementation of the method and functions described herein. Therefore, according to embodiments of the present invention, there is provided a computer program product, comprising instructions arranged to cause the programmable control unit 20 to perform the steps of any of the embodiments of said methods. The computer program product may comprise program code which is stored on a computer readable medium 500, such as a non-transitory computer readable medium, as illustrated in FIG. 9, which can be loaded (e.g. into the memory 30 as illustrated in FIG. 9) and executed by said programmable control unit 20, to cause it to perform the steps of any of the embodiments of said methods.

It is an advantage of embodiments of the invention that the benefits of RTS/CTS signaling in terms of avoiding signal collisions of transmissions from different terminals is obtainable, but at a lower signaling overhead than if all terminals were requested to use RTS/CTS signaling regardless of whether they are hidden or not. The inventors have further realized that embodiments of the invention can be implemented under the current IEEE 802.11 standard without requiring any modification of the standard, which is a further advantage.

The present invention has been described above with reference to specific embodiments. However, other embodiments than the above described are possible within the scope of the invention. Different method steps than those described above, performing the method by hardware or software, may be provided within the scope of the invention. The different features and steps of the embodiments may be combined in other combinations than those described within the scope of the appended patent claims.

The invention claimed is:

1. A method for an access point of a wireless local area network, comprising:

for each individual terminal of a plurality of terminals wirelessly connected to the access point:

detecting whether that individual terminal is a hidden node for one or more of the other terminals of the plurality of terminals; and directing a request to only that individual terminal, asking that individual terminal to apply request-to-send/clear-to-send (RTS/CTS) signaling for data to be transmitted from that individual terminal to the access point only if it is detected that said individual terminal is a hidden node.

2. The method according to claim 1, wherein detecting whether said individual terminal is a hidden node for one or more of the other terminals comprises detecting a number of occurrences of events indicative of a transmission from said one or more of the other terminals when said individual terminal is already transmitting; and determining whether said individual terminal is a hidden node for said one of the other terminals based on said number.

3. The method according to claim 2, wherein an event indicative of a transmission from said one or more of the other terminals when said individual terminal is already transmitting comprises that the access point has correctly decoded a media access control (MAC) header of the transmission from said individual terminal, but has failed to decode payload data of the transmission from said individual terminal.

4. The method according to claim 2, wherein detecting whether said individual terminal is a hidden node for one or more of the other terminals comprises determining that said individual terminal is a hidden node for said one or more of the other terminals if said number of occurrences, during a detection interval, exceeds a threshold value.

5. The method according to claim 1, comprising, for detecting whether said individual terminal is a hidden node for one of the other terminals, sending, to said one of the other terminals, a request for detecting whether said individual terminal is a hidden node for said one of the other terminals;

receiving, from said one of the other terminals, a response to said request; and determining that said individual terminal is a hidden node for said one of the other terminals if said response indicates that said individual terminal is a hidden node for said one of the other terminals.

6. An access point for a wireless local area network, wherein the access point has one or more modes of operation and comprises:

circuitry adapted to wirelessly connect to each individual terminal of a plurality of terminals;

a control unit, wherein the control unit is adapted to, in a mode of operation of the access point:

for said each individual terminal of the plurality of terminals wirelessly connected to the access point:

detect whether that individual terminal is a hidden node for one or more of the other terminals of the plurality of terminals; and direct a request to only that individual terminal, asking that individual terminal to apply request-to-send/clear-to-send (RTS/CTS) signaling for data to be transmitted from that individual terminal to the access point only if one or more criteria are satisfied, wherein the one or more criteria comprises detection that said individual terminal is a hidden node.

7. The access point according to claim 6, wherein the control unit is adapted to, for detecting whether said individual terminal is a hidden node for one or more of the other terminals, detect a number of occurrences of events indicative of a transmission from said one or more of the other terminals when said individual terminal is already transmitting; and determine whether said individual terminal is a hidden node for said one or more of the other terminals based on said number.

8. The access point according to claim 7, wherein an event indicative of a transmission from said one or more of the other terminals when said individual terminal is already transmitting comprises that the control unit has correctly decoded a media access control (MAC) header of the transmission from said individual terminal, but has failed to decode payload data of the transmission from said individual terminal.

9. The access point according to claim 7, wherein the control unit is adapted to determine that said individual terminal is a hidden node for said one or more of the other terminals if said number of occurrences, during a detection interval, exceeds a threshold value.

10. The access point according to claim 6, wherein the control unit is adapted to, for detecting whether said individual terminal is a hidden node for one of the other terminals, send, to said one of the other terminals, a request for detecting whether said individual terminal is a hidden node for said one of the other terminals;

receive, from said one of the other terminals, a response to said request; and determine that said individual terminal is a hidden node for said one of the other terminals if said response indicates that the terminal is a hidden node for said one of the other terminals.

11. The access point according to claim 6, wherein, in a mode of operation of the access point, the one or more criteria comprises detection that individual terminal is a hidden node for one or more of the other terminals, and at least one other criterion that must be satisfied before requesting the individual terminal to apply RTS/CTS signaling.

12. The access point according to claim 11, wherein the at least one other criterion comprises a power level of signals received at the access point from the individual terminal not exceeding a threshold.

13. The access point according to claim 6, wherein the access point is a user equipment (UE) for connection to a cellular communication network, wherein the UE is adapted to share its cellular connectivity with said plurality of terminals via wireless local area network tethering.

14. The access point according to claim 13, wherein the access point is a mobile telephone.

15. A non-transitory computer readable storage medium having stored thereon computer program instructions for executing a method when said computer program instructions are run by a programmable control unit of an access point of a wireless local area network, wherein the method comprises:

for each individual terminal of a plurality of terminals wirelessly connected to the access point:

detecting whether that individual terminal is a hidden node for one or more of the other terminals of the plurality of terminals; and directing a request to only that individual terminal, asking that individual terminal to apply request-to-send/clear-to-send (RTS/CTS) signaling for data to be transmitted from that individual terminal to the access point only if it is detected that said individual terminal is a hidden node.

* * * * *